(12) United States Patent
Pohl et al.

(10) Patent No.: US 8,112,738 B2
(45) Date of Patent: Feb. 7, 2012

(54) APPARATUS AND METHOD OF CUSTOMIZABLE MODEL IMPORT AND EXPORT TO AND FROM XML SCHEMA FORMATS

(75) Inventors: Christoph Pohl, Karlsruhe (DE); Diego Ricardo Rapela, Ladenburg (DE)

(73) Assignee: SAP AG, Walldorf (DE)

( * ) Notice: Subject to any disclaimer, the term of this patent is extended or adjusted under 35 U.S.C. 154(b) by 1028 days.

(21) Appl. No.: 11/904,167

(22) Filed: Sep. 26, 2007

(65) Prior Publication Data
US 2009/0083297 A1 Mar. 26, 2009

(51) Int. Cl.
*G06F 9/44* (2006.01)
(52) U.S. Cl. .................... 717/104; 717/108; 717/121
(58) Field of Classification Search ............... None
See application file for complete search history.

(56) References Cited

U.S. PATENT DOCUMENTS

| | | | |
|---|---|---|---|
| 6,292,932 | B1 | 9/2001 | Baisley et al. |
| 7,451,432 | B2 * | 11/2008 | Shukla et al. ............... 717/106 |
| 7,559,052 | B2 * | 7/2009 | Kalia et al. ............... 717/121 |
| 7,617,481 | B2 * | 11/2009 | Joe et al. ............... 717/106 |
| 7,631,291 | B2 * | 12/2009 | Shukla et al. ............... 717/107 |
| 7,774,746 | B2 * | 8/2010 | Mansfield et al. ............... 717/106 |
| 2005/0050068 | A1 * | 3/2005 | Vaschillo et al. ............... 707/100 |
| 2006/0048107 | A1 * | 3/2006 | Thiagarajan et al. ........... 717/136 |
| 2006/0074732 | A1 * | 4/2006 | Shukla et al. ............... 705/8 |
| 2006/0074734 | A1 * | 4/2006 | Shukla et al. ............... 705/8 |
| 2006/0149408 | A1 * | 7/2006 | Speeter et al. ............... 700/126 |
| 2006/0230057 | A1 * | 10/2006 | Kosov et al. ............... 707/102 |
| 2007/0079299 | A1 * | 4/2007 | Daly ............... 717/141 |
| 2008/0082959 | A1 * | 4/2008 | Fowler ............... 717/104 |
| 2008/0276229 | A1 * | 11/2008 | Hawkins et al. ............... 717/136 |

OTHER PUBLICATIONS

Zepeda et al., Specifying Metamodel transformations for Data Warehouse design, 2005, pp. 266-267, <www.acm.com/2005/zepeda.pdf>.*
A. Agrawal, Metamodel Based Model Transformation Language, 2003, pp. 386-387, <www.acm.com/2003/agrawal.pdf>.*
Laguna et al., Requirements Variability Models: Meta-model based Transformations, 2005, pp. 1-9, <www.acm.com/2005/laguna.pdf>.*
Falk Hartmann, "Systems and Methods of Transforming XML Schemas", Oct. 31, 2006, U.S. Appl. No. 11/590,330.
Milan V. Milanovi, "Modeling Rules on the Semantic Web", University of Belgrade Thesis, 2007, pp. 21-44, 82-111, Belgrade, Serbia.
Wensheng Weng, "Evaluation of UML Model Transformation Tools", Jun. 21, 2005, pp. 40-82.

* cited by examiner

*Primary Examiner* — Thuy Dao
(74) *Attorney, Agent, or Firm* — Fountainhead Law Group P.C.

(57) ABSTRACT

In one embodiment the present invention includes a computer-implemented method of converting first metadata to second metadata using a mapping and custom exits. The metadata is at the M1 level and the mapping is generated based on information at the M2 level. The custom exits provide programmable mapping rules in addition to the mapping. In this manner, metadata created in one modeling environment may be used in another modeling environment.

20 Claims, 11 Drawing Sheets

```java
package com.sap.tc.moin.imoin.exit;

import java.util.Map;

import javax.jmi.reflect.RefObject;

import org.dom4j.Element;
import org.dom4j.Node;

import com.sap.tc.moin.imoin.Converter;
import com.sap.tc.moin.repository.Connection;

/**
 * Simple API for iMOIN custom exits. Custom exits are used whenever a simple
 * name-based mapping of XML elements to MOF elements is not possible.
 *
 * @author D044522
 */
public interface ICustomExit {

/**
     * Initializes the custom exit before it is actually usable.
     *
     * @param connection to MOIN repository
     * @param refObjectCache map (XPath, RefObject) of already created model
     * elements during import
     * @param xPathCache (MOFID, XPath) of already created XML elements during
     * export
     * @param converter for callbacks
     */
    void initialize(final Connection connection, final Map<String, RefObject>
refObjectCache,
            final Map<String, Element> xPathCache, final Converter importer);

/**
     * Transforms a DOM node into a corresponding MOF element.
     *
     * @param inputNode the DOM node to be imported.
     * @param outputParent the innermost output MOF model element under which
     * the input is to be imported.
     * @return corresponding output MOF model element for the given input DOM
     * node.
     */
    RefObject importXML(Node inputNode, RefObject outputParent);

/**
     * Transforms a MOF element into a corresponding DOM node.
     *
     * @param inputElement the MOF element to be exported.
     * @param outputParentNode the innermost output DOM Node under which the
     * input is to be exported.
     * @return corresponding output DOM node for the given input MOF element.
     */
    Node exportXML(RefObject inputElement, Node outputParentNode);
```

APPARATUS AND METHOD OF CUSTOMIZABLE MODEL IMPORT AND EXPORT TO AND FROM XML SCHEMA FORMATS

CROSS REFERENCE TO RELATED APPLICATIONS

Not Applicable.

BACKGROUND

The present invention relates to model transformation, and in particular, to customizable model import and export to and from extensible markup language (XML) schema formats.

Unless otherwise indicated herein, the approaches described in this section are not prior art to the claims in this application and are not admitted to be prior art by inclusion in this section.

A model is a representation of the structure and/or behavior of an application or system. A representation is based on a language that has a well defined form ("syntax"), meaning ("semantics"), and possibly rules of analysis, inference, or proof for its constructs. The syntax may be graphical or textual. For building a concrete model, some infrastructure is needed, for example how should the semantics look, etc. A metamodel may be used to make a language for model. Meta-modeling is the process of designing languages through meta and meta-meta notations. These notations help to ensure syntactically correct specifications as well as in the construction of customizable modeling. The idea behind metamodeling is to provide Tool and Data interchange between many different tools.

The state of the art in metamodeling is using a fixed metamodel for a specific area. With the rapid changes in business logic, the need for freely created metamodels is growing up with the rapid changes in business logic. In answer to this demand for modeling, the Object Management Group (OMG) has introduced the concept of a Meta Object Facility (MOF) in the framework of a model driven architecture (MDA).

The MOF is the OMG's adopted technology for defining metadata and representing it as common object request broker architecture (CORBA) objects. An MOF metamodel defines the abstract syntax of the metadata in the MOF representation of a model. The MOF model itself describes the abstract syntax for representing. MOF metamodels can be represented using a subset of unified modeling language (UML) syntax. The MOF Model is made of two main packages (in MOF 2.0): essential MOF (EMOF) and complete MOF (CMOF).

Figure 1:
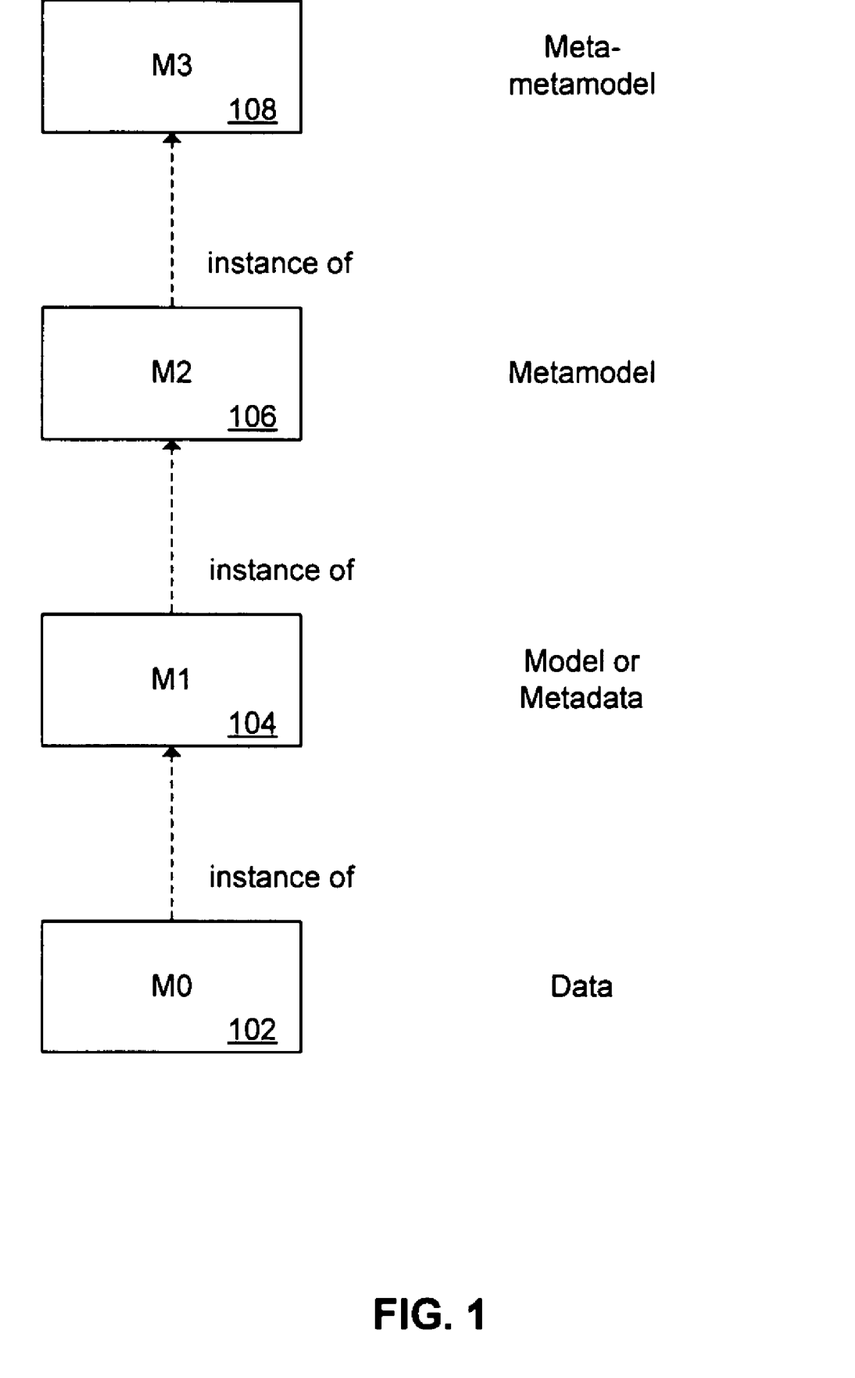
FIG. 1 illustrates the four level metamodeling hierarchy.

FIG. 1 is a block diagram of the four level hierarchy of metamodeling in MOF. The four levels are the M0 level 102, the M1 level 104, the M2 level 106, and the M3 level 108.

The M0 level 102 contains the run-time instances of the user. The instances have data that is used by the instances. The instances can be in different forms, for example as databases. The elements of the M0 level may be generally referred to as "data". Specific examples of M0 instances include a customized order management process and a specific purchase order.

The M1 level 104 contains models, for example, a UML model of a software system. Each element in the M0 level 102 is an instance of an element of the M1 level 104. M1 elements directly specify what instances in the M0 world look like. The M1 level is the traditional understanding of a "model". The elements of the M1 level may also be generally referred to as "metadata" (since they are "meta" to the "data" of the M0 level). Specific examples of M1 elements include the web service description language (WSDL), an order management process component, and a purchase order business object.

The elements that exist at the M1 level 104 (for example, class, attributes, and other model elements) are themselves instances of classes at the M2 level 106. An element at the M2 level 106 specifies the elements at the M1 level 104. The same relationship that is present between elements of levels M0 and M1 exists between elements of M1 and M2. Every element at M1 is an instance of an M2 element, and every element at M2 categorizes M1 elements. The model that resides at the M2 level is called a "metamodel" (since it is "meta" to the "model" of the M1 level). UML, extensible markup language (XML) schema definition (XSD), and common warehouse metamodel (CWM) are examples of such languages. Specific examples of M2 metamodels include process components, business objects, and integration scenarios.

Every element at M2 is an instance of an M3 element, and every element at M3 categorizes M2 elements. The M3 level 108 defines the concepts needed to reason about concepts from the M2 level 106. Within the OMG, the MOF is the standard M3 language. All modeling languages (like UML, XSD, CWM, and so on) are instances of the MOF. The elements of the M3 level may be generally referred to as "meta-metamodels" (since they are "meta" to the "metamodels" of the M2 level).

Another example of a MOF is SAP's Modeling Infrastructure (MOIN). MOIN is a development project within SAP's NetWeaver organization. One aspect of the MOIN project is to implement the platform for SAP's next generation of modeling tools.

Eclipse is an open source community whose projects are focused on building an extensible development platform, runtimes and application frameworks for building, deploying and managing software across the entire software lifecycle. Eclipse project categories include enterprise development, embedded and device development, rich client platform, rich internet applications, application frameworks, application lifecycle management (ALM), and service oriented architecture (SOA).

The Eclipse modeling framework (EMF) is a modeling framework and code generation facility for building tools and other applications based on a structured data model. From a model specification described in extensible markup language (XML) metadata interchange (XMI), EMF provides tools and runtime support to produce a set of Java classes for the model, a set of adapter classes that enable viewing and command-based editing of the model, and a basic editor. Models can be specified using annotated Java, XML documents, or modeling tools like Rational Rose, then imported into EMF. EMF is another example of an M3 level model.

Given two types of M3 level models, for example MOIN and EMF, it is desirable that metadata created with one type of M3 model be accessible by the other type of M3 model. Current implementations of integration tools are lacking in ease of use, and it is cumbersome to implement new integration tools for additional metamodels. EMF provides a default mapping for importing XSD to EMF metamodels but does not allow the developer to influence the generated models manually; for each M2 metamodel, a model importer has to be written manually to import M1 instances and make them compliant with the M2 metamodel.

As another example, EMF currently only generates a trace (mapping) that is used only for informational purposes and is not used any further. Given the EMF trace (mapping), a developer must program a complete importer function to import a M2 metamodel into MOIN without having any reuse option.

Thus, there is a need to reduce efforts for writing import and export tools for model component integration purposes. More specifically, there is a need for processing instances of metamodels at the M2 level to create corresponding M1 instances.

Thus, there is a need for improved model integration tools. The present invention solves these and other problems by providing an apparatus and method of customizable model import and export to and from XML schema formats.

SUMMARY

Embodiments of the present invention improve model integration tools. In one embodiment the present invention includes a computer-implemented method of converting first metadata to second metadata. The first metadata is related to a first model and the second metadata is related to a second model. The method includes providing a declarative mapping between a first metamodel and a second metamodel. The first metamodel relates to the first model and the second metamodel relates to the second model. The method further includes providing custom exits. The custom exits provide programmable mapping rules in addition to the declarative mapping. The method further includes applying the declarative mapping and the custom exits to the first metadata to result in the second metadata.

A computer system according to an embodiment of the present invention may include software components that implement the above-described method.

A computer-readable medium according to an embodiment of the present invention may include software components that implement the above-described method.

In accordance with embodiments of the present invention, metadata developed in one modeling environment (for example, Eclipse) may be used in a different modeling environment (for example, MOIN), and vice versa.

The following detailed description and accompanying drawings provide a better understanding of the nature and advantages of the present invention.

BRIEF DESCRIPTION OF THE DRAWINGS

FIG. 7 illustrates an example of an interface for providing a valid Custom Exit.

DETAILED DESCRIPTION

Described herein are techniques for customizable model import and export to and from XML schema formats. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

The following description makes specific references to Eclipse, EMF, and MOIN. However, the principles of embodiments of the present invention may be applied to other types of metadata technologies and modeling technologies.

As new MOIN-based tools are developed, metadata produced with other tools based on other technologies is desired to be accessible from MOIN (and vice versa). According to one embodiment of the present invention, read-only import of external (XSD-based) content and read-only export of MOIN models to (XSD-based) standard formats are performed. As an import example, an embodiment of the present invention allows MOIN to reference WSDL/XSD created by WTP (Eclipse Web Tools Project). As another import example, an embodiment of the present invention allows MOIN to reference WebDynpro content. As an export example, an embodiment of the present invention allows MOIN to export Core Component Technical Specification (CCTS) data types as XSD.

First Set of Embodiments

Figure 2:
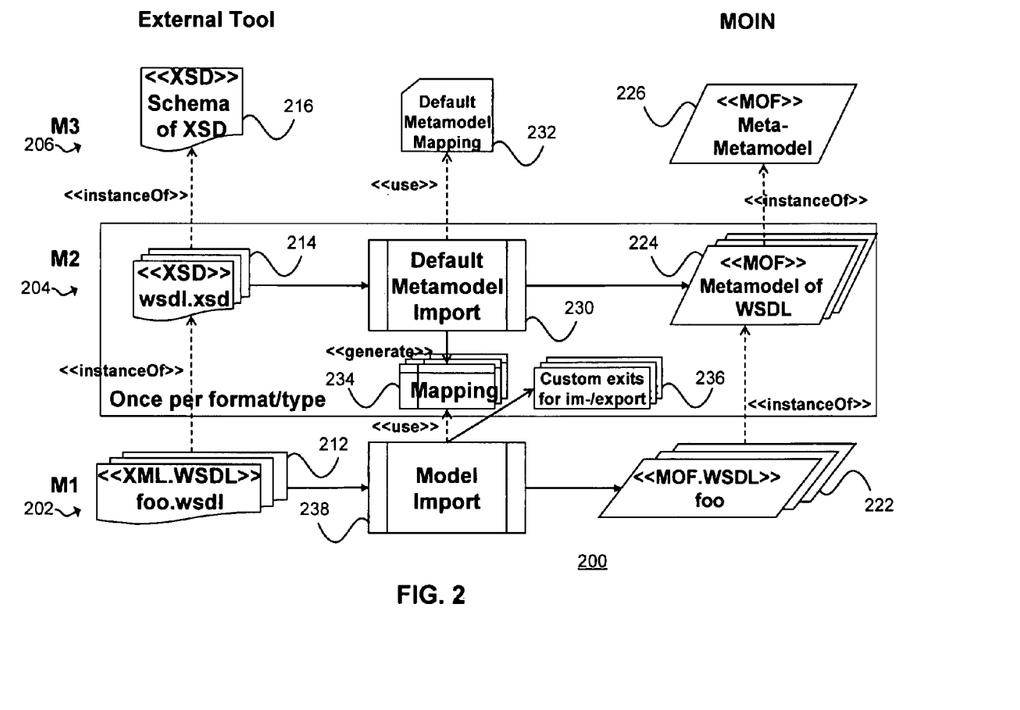
FIG. 2 is a block diagram of a system that illustrates an embodiment of the present invention.

FIG. 2 is a block diagram of a system 200 that illustrates an embodiment of the present invention. The embodiment of FIG. 2 may be implemented as data and software components stored and executed by a computer system. Arranged vertically are the metamodeling hierarchy of levels, including the M1 level 202, the M2 level 204, and the M3 level 206.

On the left are data and models related to a first format, for example XML and XSD information. This XML and XSD information includes WSDL information 212 at the M1 level 202, XSD information 214 at the M2 level 204, and XSD schema information 216 at the M3 level 206. The WSDL information 212 is an instance of the XSD information 214, which is itself an instance of the XSD schema 216. (Referring back to FIG. 1, the WSDL information 212 at the M1 level 202 may also be referred to generally as model data or metadata. The metadata may be in a format determined by the model.)

On the right are data and models related to a second format, for example, MOIN information. This MOIN information includes MOIN metadata 222 at the M1 level 202, a MOIN metamodel 224 at the M2 level 204, and a MOIN meta-metamodel 226 at the M3 level 206. The MOIN metadata 222 is an instance of the MOIN metamodel 224, which is itself an instance of the MOIN meta-metamodel 226.

In the center are software components and files related to the import and export of the metadata and related model data. A default metamodel import component 230 at the M2 level 204 uses a default metamodel mapping 232 at the M3 level to relate the XSD information 214 and the MOIN metamodel 224. The default metamodel import component 230 generates a mapping component 234. In addition, custom exits 236 may be generated. A model import component 238 uses the mapping component 234 and the custom exits 236 to transform the WSDL information 212 to the MOIN metadata 222 at the M1 level 202.

At the M1 level 202, the idea is to use the model importer 238 that can be configured with mapping information between the XSD schema of the source artifact (e.g., wsdl.xsd) and the target MOIN metamodel of the target artifact (e.g., WSDL metamodel). Using this mapping, the model importer 238 finds the correct output meta-model element to instantiate for a given XML (DOM—document object model) element on the input side. The corresponding export works in a similar fashion in the opposite direction.

Even though this mapping approach may suffice for most cases where only simple mappings are used, some complex mappings may be hard to express by direct one-to-one mappings. For such cases, and also for processing different referencing mechanisms of XSD, the custom exits 236 may be provided for specific XSD and/or metamodel elements.

According to one embodiment, the MOIN metamodel 224 as well as the mapping table 234 used for a given XML schema (like WSDL) may be provided manually. According to another embodiment, the MOIN metamodel 224 may be generated from a given XML schema 214, and at the same time the matching mapping 234 may be generated. Afterwards, any modification of the MOIN metamodel 224 may be reflected either in updates to the corresponding mapping 234 or in additional custom exits 236 (and vice-versa).

Figure 3:
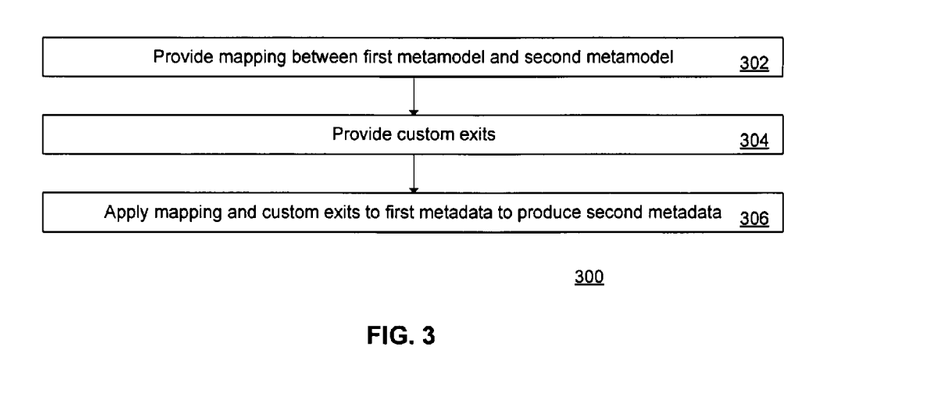
FIG. 3 is a flowchart of a customizable model import or export process according to an embodiment of the present invention.

FIG. 3 is a flowchart of a customizable model import or export process 300 according to an embodiment of the present invention. The process 300 may be implemented on and performed by a computer system, for example, as data stored by the computer system or as software or other computer programs that the computer system executes.

The process 300 converts first metadata to second metadata. These metadata reside at the M1 level 104 (see FIG. 1). The first metadata is related to a first model at the M1 level 104, and the second metadata is related to a second model at the M1 level 104. The first metadata and the first model at the M1 level 104 are instances of a first metamodel at the M2 level 106 (see FIG. 1). The second metadata and the second model at the M1 level 104 are instances of a second metamodel at the M2 level 106 (see FIG. 1).

As an example, with reference to FIG. 2, the first metadata may be the WSDL information 212, and the second metadata may be the MOIN metadata 222. As another example, the first metadata may be persisted in an XML-based format, for example EMF, and the second metadata may be persisted in MOIN. As another example, the first metamodel may be the XML schema 214, and the second metamodel may be the MOIN metamodel 224.

In step 302, a declarative mapping is provided between the first metamodel and the second metamodel. "Declarative" means a one-to-one association of source and target elements without the need for programming. As an example, with reference to FIG. 2, the mapping may be the mapping component 234.

In step 304, custom exits are provided. The custom exits provide programmable mapping rules in addition to those of the mapping. As an example, with reference to FIG. 2, the custom exits may be the custom exits 236.

In step 306, the mapping and the custom exits are applied to the first metadata to result in the second metadata. As an example, with reference to FIG. 2, the model import component 238 may apply the mapping 234 and the custom exits 236 to the WSDL information 212 to generate the MOIN metadata 222.

Further details regarding the process 300 are provided below.

Figure 4:
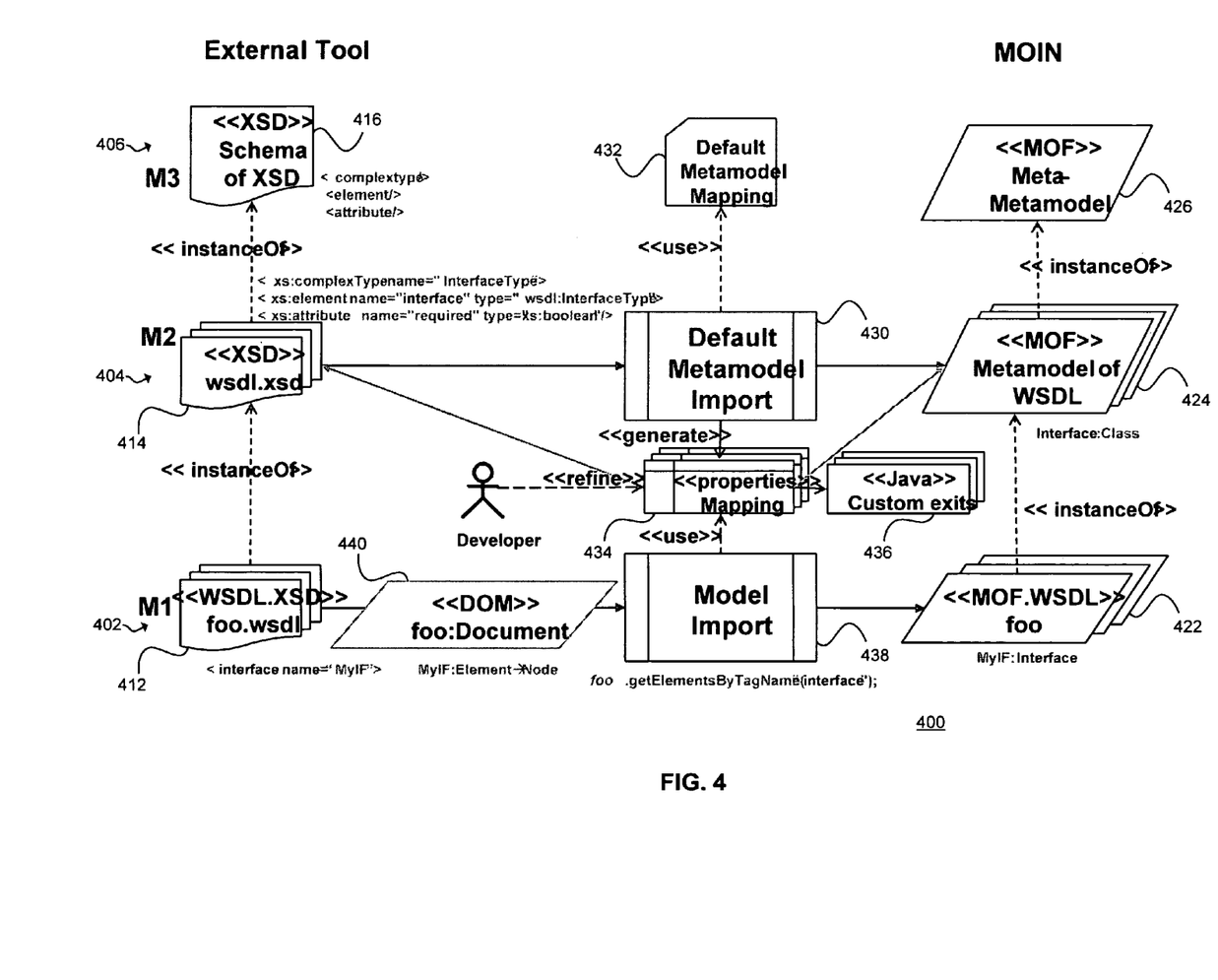
FIG. 4 is a block diagram of a system that illustrates an embodiment of the present invention.

FIG. 4 is a block diagram of a system 400 that illustrates an embodiment of the present invention. The embodiment of FIG. 4 may be implemented as data and software components stored and executed by a computer system. The elements 402, 404, 406, 412, 414, 416, 422, 424, 426, and 438 are similar to the elements of FIG. 2, with differences noted below.

At the core, the mapping 434 from XSD-based input elements 414 to MOF-based output elements 424 may be done on the M2 level 404 by a-list of properties, i.e., String typed key-value-pairs as they are common in Java for storing configurations, etc. Input keys may be XML element names (as defined in XSD element or type definitions), e.g., "interface" in FIG. 4. Output values may be either MOF ModelElements or names of Java Classes.

The MOF ModelElements may point to the corresponding metamodel element to instantiate, e.g., "Interface:Classifier" in FIG. 4. Alternatively, a MOF Id may be used to uniquely identify an element. (The alternate solution is less prefereable due to maintenance effort without proper tool support due to the bad readability for humans.)

The names of Java Classes may be used where custom exits describe how to proceed with the input element for certain special cases where a simple one-to-one mapping does not suffice. The application programming interface (API) and programming model of these custom exits are described below (see heading "API and Programming Model for Custom Exits").

According to one embodiment, developers can define the mapping manually according to a given (also hand-crafted) target metamodel on the MOIN side. According to another embodiment, a Default metamodel Import feature (similar to Eclipse's EMF XSD import), generates the target metamodel and the corresponding mapping definitions. Experiments with EMF have shown that such default import mechanisms yield low quality results especially for more complex XML schemata (like WSDL). Consequentially, developers may then refine both the imported metamodel as well as the mapping definitions, potentially in a synchronized fashion.

As a vehicle for accessing XML elements by name, the DOM API 440 (part of J2SE as package org.w3c.dom) may be used. The relevant subset of DOM for this purpose is outlined in FIG. 5.

Figure 5:
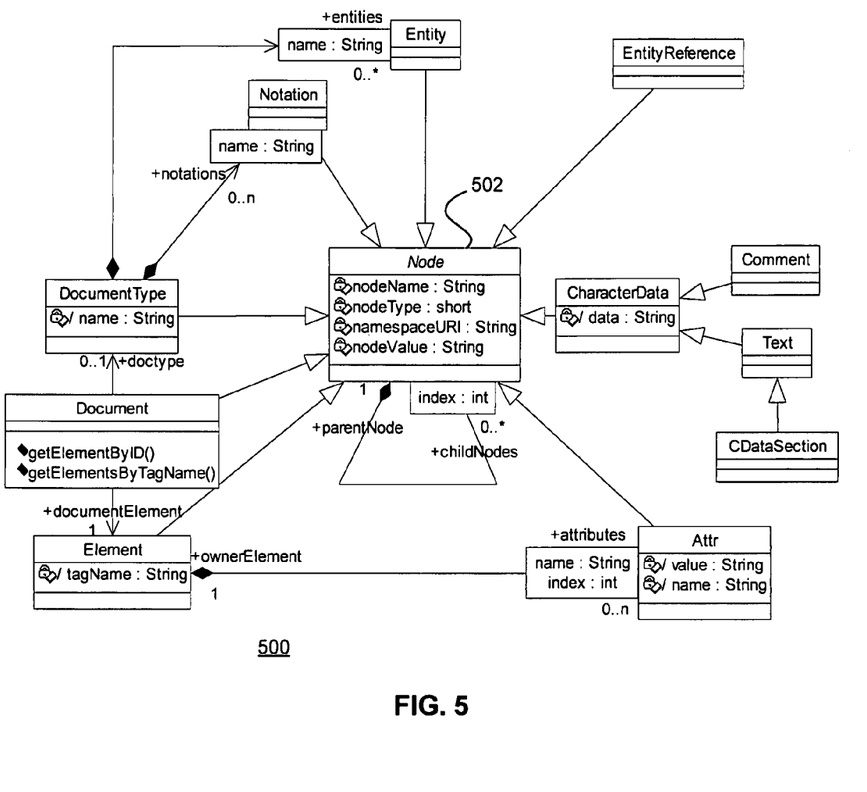
FIG. 5 is a block diagram of a subset of the DOM API used for accessing XML elements by name, according to an embodiment of the present invention.

FIG. 5 is a block diagram 500 of a subset of the DOM API used for accessing XML elements by name, according to an embodiment of the present invention.

The Node 502 is the central superinterface of all relevant DOM constructs. An ordered composition relationship is spanned between parent and child Nodes. This is the primary vehicle to navigate through the DOM tree, complemented by the name-mapped ownerElement-attributes relationship between Elements and Attributes, which is interestingly enough not a refinement of the recursive parent-child composition. The root of the DOM tree is represented by the Document Node, which features exactly one documentElement.

Relevant in the context of MOIN interoperability (IMOIN) is the capability of finding all Elements within a Document by a given TagName. In the example of FIG. 4, this allows the Model Import component 438 to locate all instances of "interface" in a WSDL document 412 for instantiating corresponding "Interfaces" on MOIN side (for example, as part of 422).

Figure 6:
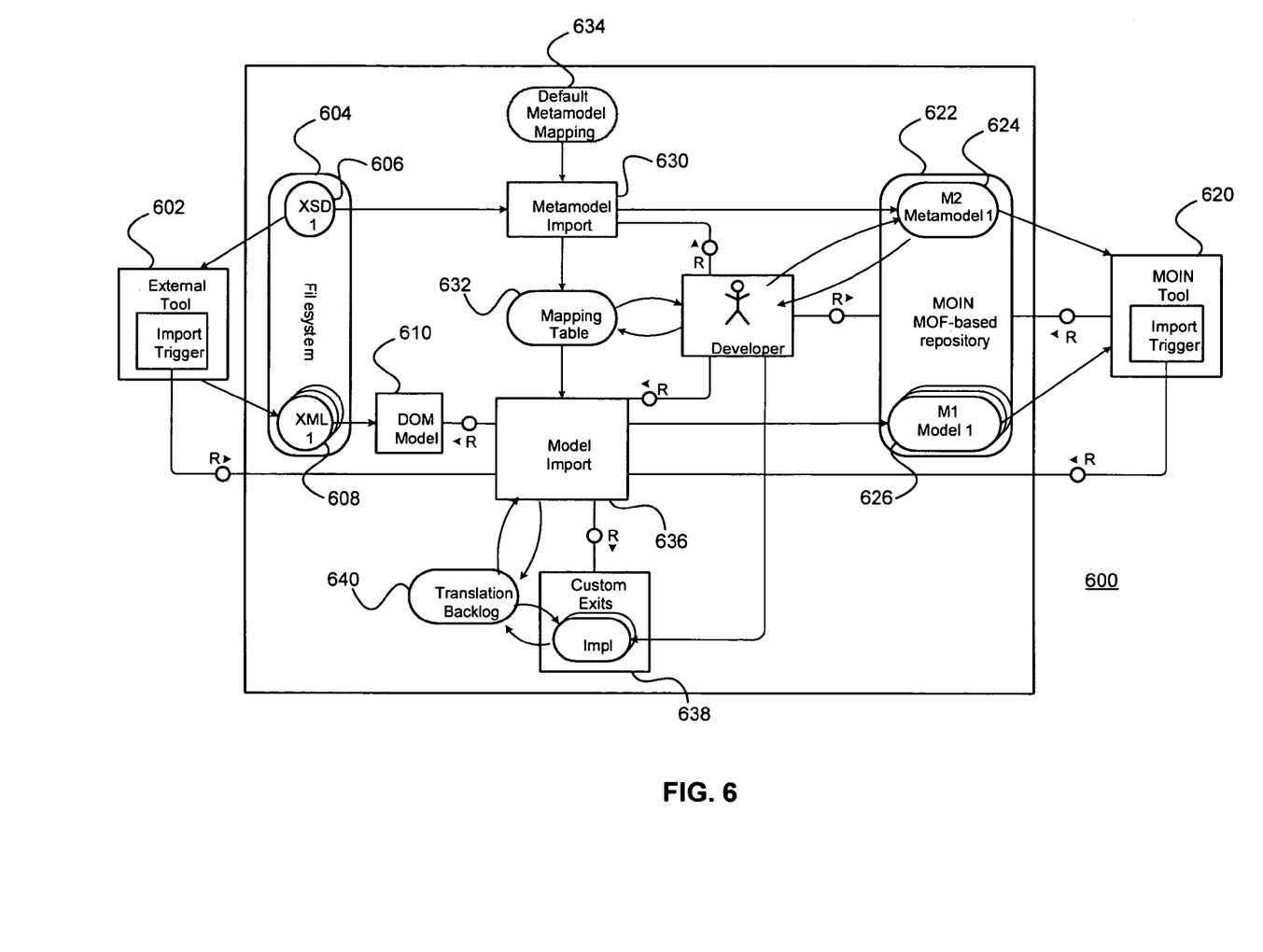
FIG. 6 is a block diagram of a system according to an embodiment of the present invention.

FIG. 6 is a block diagram of a system 600 according to an embodiment of the present invention. The embodiment of FIG. 6 may be implemented as data and software components stored and executed by a computer system. An external tool 602 interacts with the filesystem 604 to access the XSD information 606 and the XML information 608. A DOM model component 610 interfaces with the filesystem 606 to import the relevant parts of the XML information 608. The external tool 602 may be, for example, Eclipse tools.

On the MOIN side, a MOIN tool 620 interfaces with a MOIN MOF-based repository 622 to access the NU metamodel information 624 and the M1 model information 626.

A metamodel import component 630 interfaces with the filesystem 606 and with the MOIN MOF-based repository 622. The metamodel import component 630 may generate the mapping table 632. The metamodel import component may interface with the default metamodel mapping 634 to generate the mapping table 632. The model import component 636 interfaces with the DOM model 610 and with the MOIN MOF-based repository 626. The model import component 636 uses the mapping table 632 and the custom exits 638 to generate the M1 model information 626. (The label "Impl" in the custom exits component 638 denotes the multitude of implementations of CustomExits that the ModelImport may use in addition to the declarative mapping table.) The translation backlog component 640 is described in the section "API and Programming Model for Custom Exits" below.

The embodiment of FIG. 6 elaborates the embodiment of FIG. 4 with respect to data and control flow. The data and control flow shows importing a certain XSD-based format, for instance, WSDL files based on an XSD definition of the WSDL format, which are to be imported as models of a MOF-compliant WSDL model on MOIN side.

The Model Import may be triggered in one of three following ways. The first way is via push, when the producing external tool triggers import upon save or rebuild. The second way is via pull, when the consuming MOIN tool triggers import upon some event. Third, the Developer may explicitly import certain models.

Once triggered, the Model Importer 636 uses the XML DOM parser 610 to create an in memory representation of the input document, which it then traverses recursively (depth-first) starting at the root node. It reads the Mapping Table 632 to determine a corresponding model element on MOF side for the current DOM node according to its name. If the entry in the Mapping Table 632 refers to a Java class, this class is instantiated reflectively and invoked via the Custom Exit API described in the section "API and Programming Model for Custom Exits" below. A Translation Backlog 640 keeps track of already processed elements as well as elements whose processing has been postponed because required references need to be resolved first. This issue is also described below in the context of the Custom Exit API. The import terminates as soon as the DOM tree is completely traversed.

Regarding the evaluation of entries in the Mapping Table, there are two alternative strategies: a minimalistic/implicit strategy, and a verbose/explicit strategy.

In the minimalistic/implicit strategy, if no entry is found for the currently processed input Node, the Model Importer 636 implicitly assumes the same containment structure for the output model and tries to instantiate model elements with equal names as the input Nodes. For instance, XML Attributes may be mapped to MOF Attributes.

In the verbose/explicit strategy, if no entry is found for the currently processed input Node, the Model importer 636 does nothing and proceeds immediately with to the next sibling Node. This strategy is preferred in one embodiment for the following reason: There is often more than one valid mapping. For instance, XML Attributes could just as well be modeled in MOF as associated Classes. If the default mapping changes, this would not only affect the Metamodel Import but also the Model Import implementations. Hence, an explicit mapping for all importable nodes fosters separation of concerns.

The set of relevant metamodels and XSD-based formats are rather limited at the moment. However, referenced related work may be used and adapted to address this level. In principle, the Metamodel Import 630 eases the developer's task of providing the Mapping Table 632 by exporting this as a trace of its applied default mapping from XSD schema elements to MOF model elements. The developer may then adapt those parts of the metamodel and the mapping where the default mapping did not yield the wanted results.

Note that model export to XSD-based XML files works likewise in the opposite direction.

API and Programming Model for Custom Exits

Custom Exits enable both the import and export of XML nodes to and from MOF models. Custom exits are useful in cases where a simple 1:1 mapping of elements does not suffice anymore and complex semantics need to be resolved, or instance for mapping IDREF strings from XML to association instances in MOF. Custom Exits perform this in principle by traversing up and down the input object tree while simultaneously constructing the output object tree accordingly.

FIG. 7 illustrates an example of an interface for providing a valid Custom Exit. The interface includes both import and export components.

As mentioned above, Custom Exits will often be used to correctly transform references from input to output. It is possible in this context that referenced target is not yet present in the output model at the time the input reference is processed by the Model Importer. Consequentially, it must be handled later, as soon as its target is transformed. There are three ways to handle this issue, as follows.

The first way is to use a "double pass" Model Importer that picks up and transforms deferred element on the second run. This way may not suffice for more complex scenarios when the second pass yields more deferred elements.

The second way is to immediately transform the required reference target and continue with the depending reference element. Recursion could create quite deep call stacks if the reference target also needs to transform other elements first. Special attention needs to be paid to cycle detection if elements are to be transformed, which already appeared further up the stack. Resolving such cycles may deteriorate this solution to a "multi pass" approach similar to the previous one.

The third way, favored according to one embodiment, is to enlist deferred transformations in a Translation Backlog (such as element 640 in FIG. 6) containing transformations waiting for some element to become available on the output side. This represents sort of the opposite solution to the previous approach. If a Custom Exit realizes that some element is missing, it registers its context (input & output) as waiting for that element. The Model Importer checks with the Translation Backlog after each transformation if there are other transformations waiting for its result and invokes them accordingly.

Constraints and Limitations

In this section are discussed assumptions, constraints, and limitations of certain of the embodiments detailed above.

Figure 8:
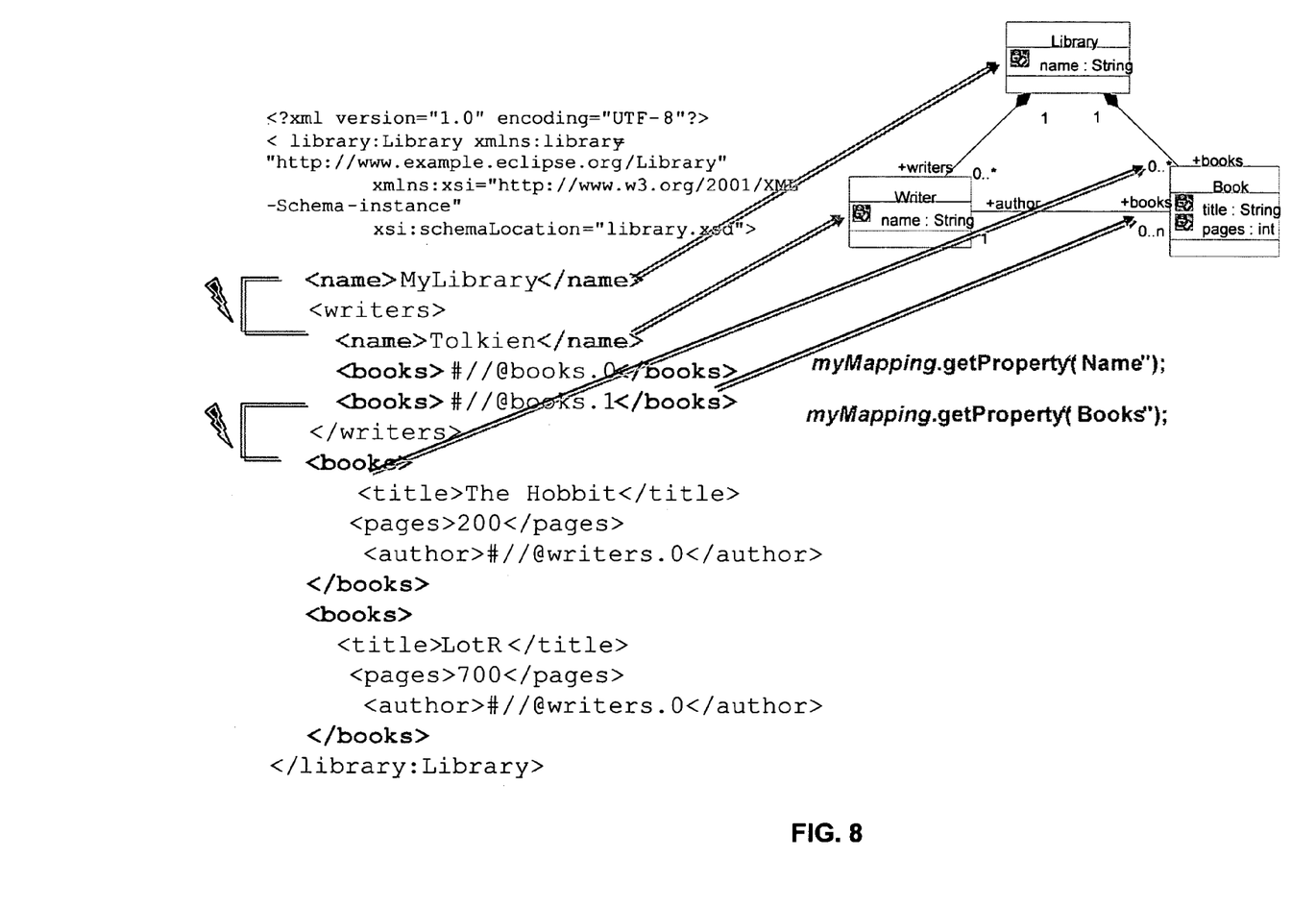
FIG. 8 illustrates an example of an element name clash.

FIG. 8 illustrates an example of an element name clash. If just simple Node names are used for identifying XML input elements, the Mapping Table would have to contain two entries for the same key, which is obviously not possible. Hence, Custom Exits would be needed in both cases ("name" and "books") for determining the right output model element, depending on the context of its occurrence. This can get pretty cumbersome for common element names, such as "name" or "id".

A valid solution (especially in combination with the "verbose/explicit" mapping strategy recommended above) according to one embodiment is the use of simple XPath expressions as keys for uniquely identifying DOM nodes, e.g., "library/name" vs. "library/writers/name".

Second Set of Embodiments

The second set of embodiments provide more details such as being an extension of the first set of embodiments.

Figure 9:
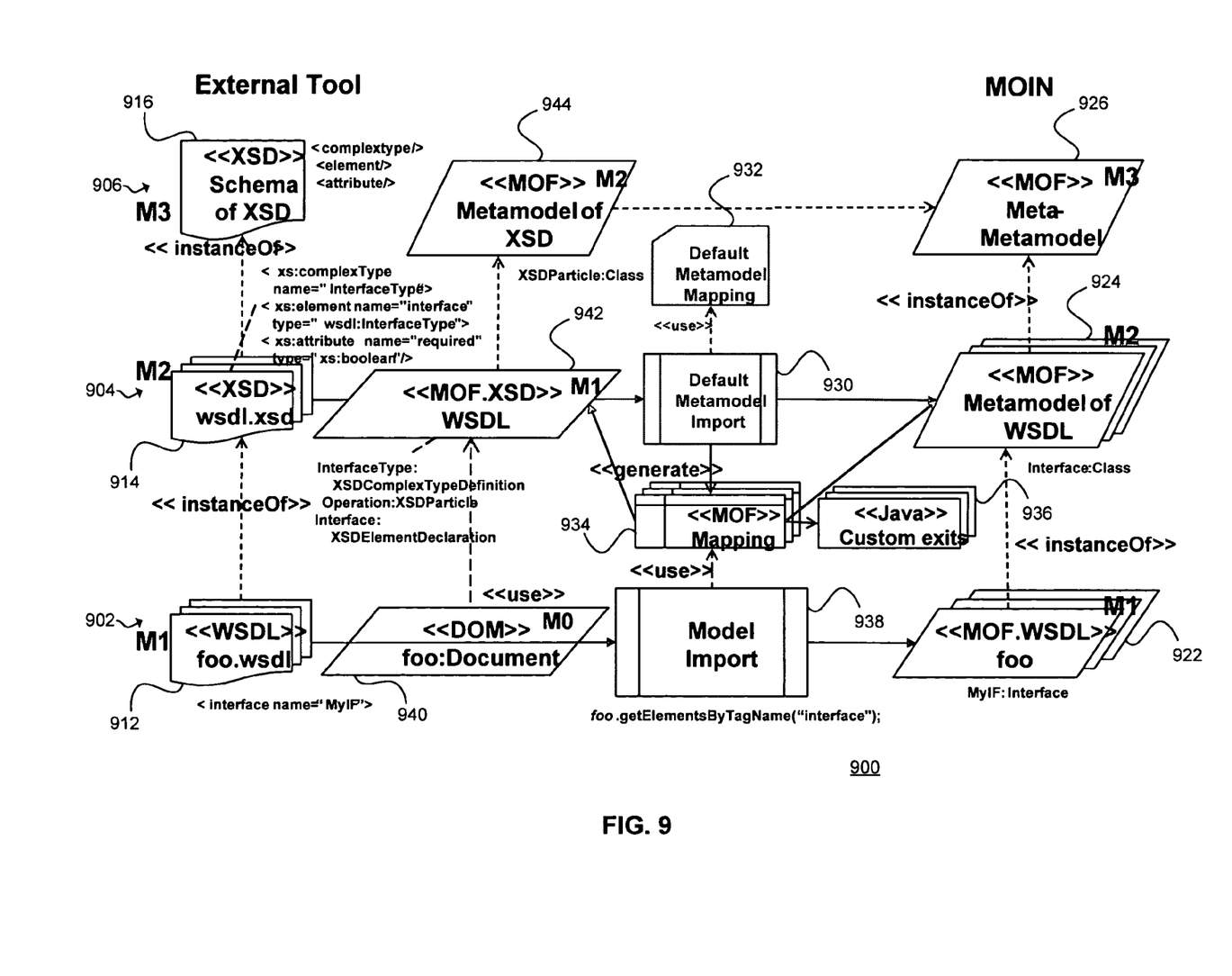
FIG. 9 is a block diagram of a system that illustrates an embodiment of the present invention.

FIG. 9 is a block diagram of a system 900 that illustrates an embodiment of the present invention. The embodiment of FIG. 9 may be implemented as data and software components stored and executed by a computer system. The elements 902, 904, 906, 912, 914, 916, 922, 924, 926, 930, 932, 934, 936, 938 and 940 are similar to the elements of FIG. 2, with differences noted below.

One feature is explicitly introducing type information to the simple DOM-based in-memory representation of XML input files by instances of an XSD-based schema model 942. This may be done indirectly via the Post Schema Validation Infoset (PSVI), which gives access to the XML Schema API that corresponds to the XSD metamodel. Hence, the Mapping Table 934 may reference instances of the MOF-based XSD metamodel 944 instead of DOM Node names. This way, the Model Import 938 represents a model transformation from XSD-based schema model instances to some other metamodel instance.

A number of issues are involved in this context.

First, there is no concept for technically representing M0 objects as model instances in MOIN. Hence, DOM Level 3 API may be used to access the PSVI of DOM Elements. The PSVI in turn exposes the XML Schema API, which parallels the XSD metamodel 914. This way, both Model Import 938 and Metamodel Import 930 may use the in-memory representation of XML Schema API to instantiate corresponding M1 XSD models in MOIN (such as 922).

Second, the Mapping table 934 now maps M1 instances of the XSD metamodel 942 to M2 elements of the target metamodel 924. Although XPath-like String expressions may be used to specify keys, this may cause two problems:

A first problem is if no implicit ID attributes are present, XSD metamodel instances can only be identified by index numbers, which are subject to change depending on storage implementations etc., for instance, "library.xsd#//Writer; XSDComplexTypeDefinition=1/XSDParticle/XSDModel-Group/XSDParticle", to identify a writer's name in the example of FIG. 8.

A second problem is without proper tool support, using MOF Ids instead results in mappings illegible for human users.

As a solution to the above problems, an embodiment of the present invention uses a MOF-based Mapping Model that relates actual model elements instead of String-based java.util.Properties.

Third, the crossing of metalevels from M0 to M1 (and M1 to M2, respectively) is a conceptual challenge. If MTI is to be used for model transformation, it may be desirable to "shift" metalevel up on the input side.

Figure 10:
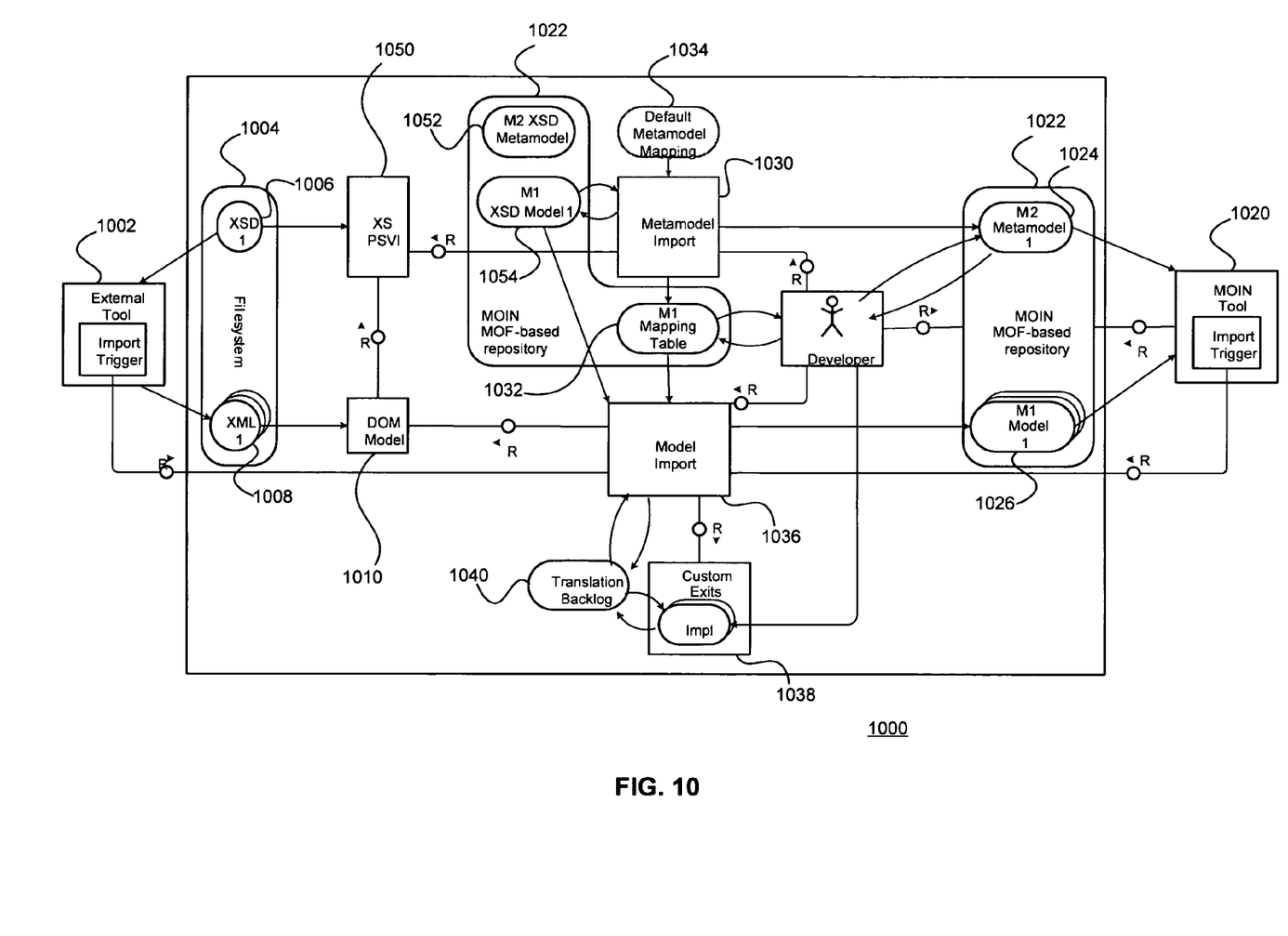
FIG. 10 is a block diagram of a system according to an embodiment of the present invention.

FIG. 10 is a block diagram of a system 600 according to an embodiment of the present invention. The embodiment of FIG. 10 may be implemented as data and software components stored and executed by a computer system. The elements 1002, 1004, 1006, 1008, 1010, 1020, 1022, 1024, 1026, 1030, 1032, 1034, 1036, 1038, 1040 are similar to the elements of FIG. 6, with differences noted below, as well as discussed above regarding FIG. 9.

The MOIN MOF-based repository 1022 stores M2 XSD metamodel 1052 and a M1 XSD model 1054 as well as the M2 metamodel 1024 and the M1 model 1026.

The DOM model component 1010 uses the DOM Level 3 API to access the PSVI component 1050. The PSVI component 1050 exposes the XML Schema API, which parallels the XSD metamodel. This is as discussed above regarding FIG. 9.

The mapping table 1032 references instances of a MOF-based XSD metamodel 1052 instead of DOM Node names. This is as discussed above regarding FIG. 9.

The model import 1036 represents a model transformation from XSD-based schema model instances (such as the XSD model 1054) to some other metamodel instance (such as the M1 model 1026). This is as discussed above regarding FIG. 9.

ID Handling

In contrast to other persistence formats, MOIN uses Globally Unique Ids (GUIDs) to create references between model elements; both in memory and in the persistence. Stable references between externally created elements (EMF/XSD) and MOIN native elements thus may involve a mapping. This can be accomplished in at least to ways. The first way is to explicitly manage the mapping information (XPath←→EGUID). The second way is to define a function to calculate MOF Ids (GUID=F(XPath)).

The first way may involve modifications to the external tool in order to re-calculate mappings during refactoring, i.e., to map Resource URIs to MOIN partition resource identifiers (PRIs) and XPaths to GUIDs. Semantic keys (paths or subsets of key attributes uniquely identifying an element) would avoid this caveat. For instance, an MQL query may be used to select the requested MOF element.

If the semantic key is also independent from the Resource URI, no fixed Resource-Partition is necessary. For instance, if an element was already imported, finding it will also allow the importer to determine its DC and Partition.

To minimize write access to MOIN, updates may be triggered by providers (e.g., WTP). On the MOIN side, querying by semantic keys allows to prevent redundant imports, even for redundant Resources. When possible, mapped MOIN Partitions may be in the same project as their source. Resources in non-MOIN projects may be managed by a MOIN project that either duplicates or references the original Resources.

Figure 11:
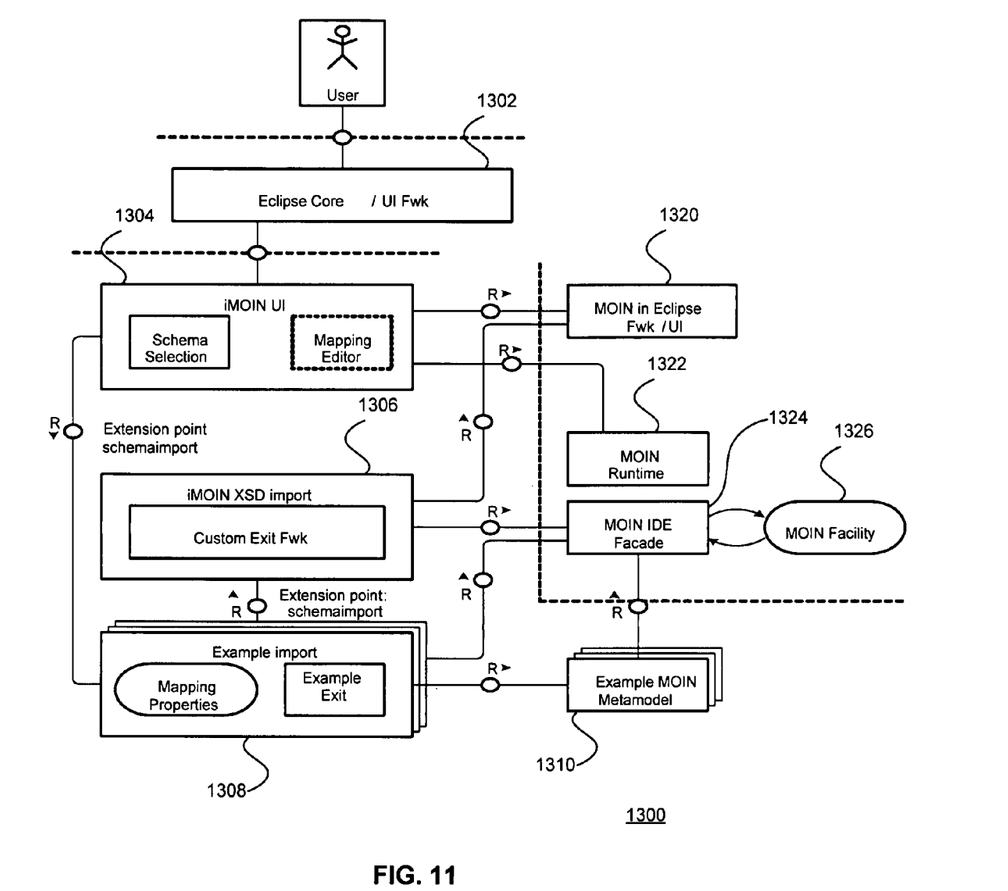
FIG. 11 illustrates a plug-in structure according to an embodiment of the present invention.

FIG. 11 illustrates a-plug-in structure 1300 according to an embodiment of the present invention. The plug-in structure 1300 may be implemented as data and software components stored and executed by a computer system. The plug-in structure 1300 may be used when implementing other embodiments of the present invention, such as the system 200 (FIG. 2), the method 300 (FIG. 3), the system 400 (FIG. 4), the system 600 (FIG. 6), etc.

The user interacts with the system via the Eclipse core user interface (UI) framework 1302. The iMOIN specific parts include the iMOIN user interface 1304, the iMOIN XSD import component 1306, the example import component 1308, and the example MOIN metamodel component 1310. (In various implementations, the "example" metamodels may be replaced by actual metamodels such as WSDL, XSD, etc.)

The MOIN components include the MOIN in Eclipse framework UI 1320, the MOIN runtime component 1322, the MOIN IDE facade 1324, and the MOIN facility component 1326.

These components interact via the request and response connections as shown in FIG. 13.

At the lowest layer, "example" can be replaced by the name of any other metamodel. The IMOIN UI 1304 can use any (Eclipse) plug-in extending the extension point "schemaimport" defined by the generic IMOIN import plug-in. Every extender plug-in may provide a properties list mapping XSD elements to metamodel elements and/or custom exits. The accompanying importer-specific custom exit implementation may be capable of handling any special mapping that cannot be accommodated by the simple 1:1 mapping declared in the properties.

Figure 12:
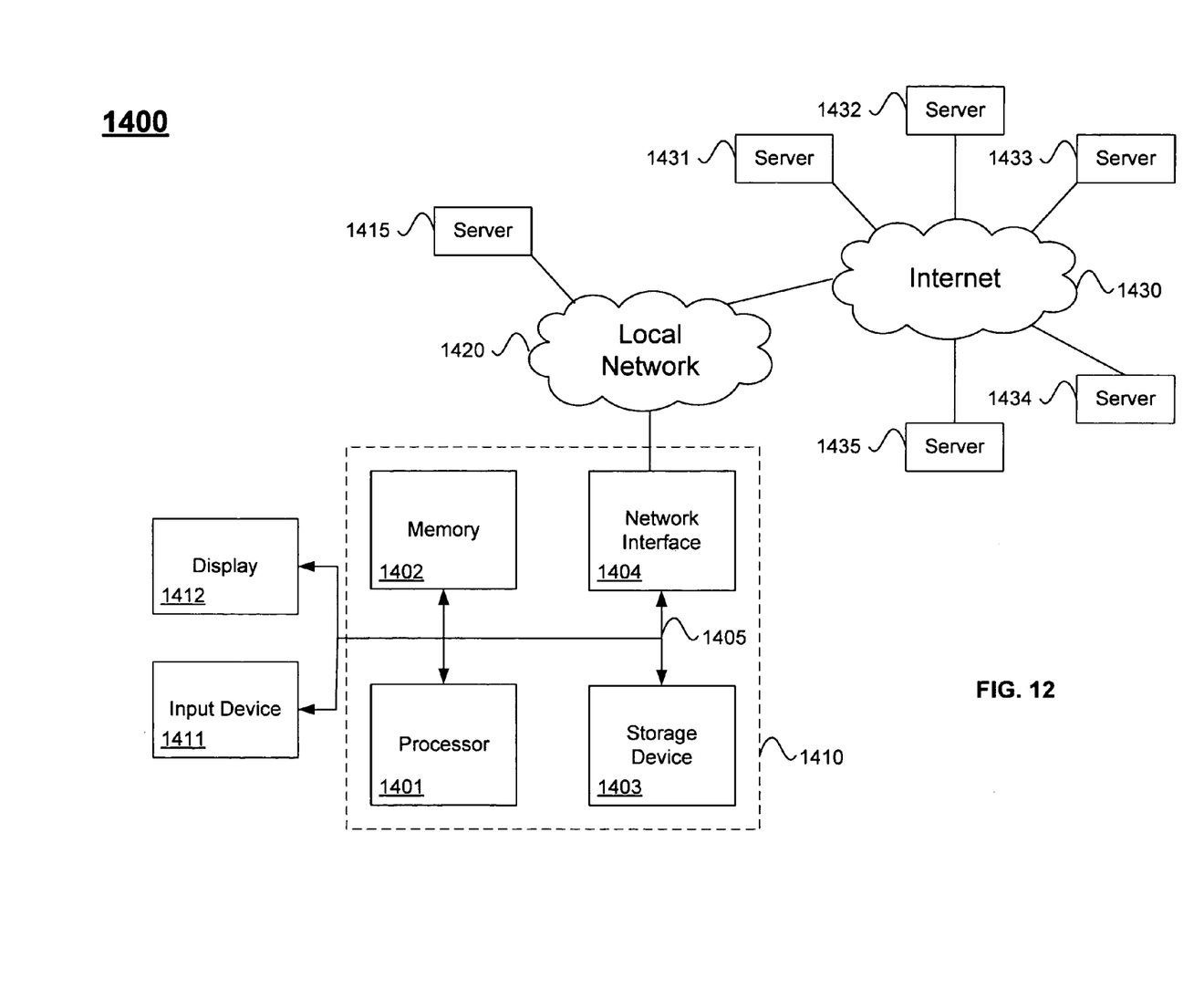
FIG. 12 is an example computer system and network for implementing embodiments of the present invention.

FIG. 14 illustrates an example computer system coupled to a network that may be used to implement the present invention. Computer system 1410 includes a bus 1405 or other communication mechanism for communicating information, and a processor 1401 coupled with bus 1405 for processing information. Computer system 1410 also includes a memory 1402 coupled to bus 1405 for storing information and instructions to be executed by processor 1401, including information and instructions for performing the techniques described above, including XML and XSD information processing, mappings, custom exits, and metadata conversion, for example. This memory may also be used for storing temporary variables or other intermediate information during execution of instructions to be executed by processor 1401. Possible implementations of this memory may be, but are not limited to, random access memory (RAM), read only memory (ROM), or both. A storage device 1403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1403 may include source code, binary code, or software files for performing the techniques or embodying the constructs above, for example.

Computer system 1410 may be coupled via bus 1405 to a display 1412, such as a cathode ray tube (CRT) or liquid crystal display (LCD), for displaying information to a computer user. An input device 1411 such as a keyboard and/or mouse is coupled to bus 1405 for communicating information and command selections from the user to processor 1401. The combination of these components allows the user to communicate with the system. In some systems, bus 1405 may be divided into multiple specialized buses.

Computer system 1410 also includes a network interface 1404 coupled with bus 1405. Network interface 1404 may provide two-way data communication between computer system 1410 and the local network 1420. The network interface 1404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 1404 sends and receives electrical, electromagnetic, or optical signals that carry digital data streams representing various types of information.

Computer system 1410 can send and receive information, including messages or other interface actions, through the network interface 1404 to an Intranet or the Internet 1430. In the Internet example, software components or services may reside on multiple different computer systems 1410 or servers 1431, 1432, 1433, 1434 and 1435 across the network. Metadata conversion processors described above may be implemented on one or more servers, for example. A server 1431 may transmit actions or messages from one component, through Internet 1430, local network 1420, and network interface 1404 to a component on computer system 1410. Metadata conversion processing may be implemented on any computer system and receive data, metadata, model information, etc. across a network, for example. In one embodiment, translation processing may be implemented as a software service by one or more servers 1431-1435, for example.

CONCLUSION

According to one embodiment of the present invention, a mapping that was automatically generated can be edited manually and used automatically by an importer function. If the structure still deviates significantly (that is, the original mapping is of low quality), a custom exit allows programming to adapt to specific elements of the M2 metamodel.

According to another embodiment of the present invention, a combination of framework technology for adaptation (exits) and simple, flexible mappings allow using a generic importer that can be customized.

One feature of an embodiment of the present invention is to enable migration between modeling tools, for example, from EMF to MOIN.

Another feature of an embodiment of the present invention is the integration of modeling tools, for example, between EMF and MOIN. For example, tools such as Eclipse tools may be outside of direct control of a business entity such as SAP. An embodiment of the present invention allows MOIN to access EMF metadata.

According to an embodiment of the present invention, a customizable XSD-based tool uses an XSD schema and mapping information to de-serialize an XML file into a custom MOIN model. According to another embodiment of the present invention, a customizable XSD-based tool uses an XSD schema and mapping information to serialize an XML file from a custom MOIN model.

According to an embodiment of the present invention, in order to be able to interoperate with different metadata repository technologies, interoperability support is integrated at the persistence format level, providing a framework that implements the repeatable import/export connection strategy using a customizable XSD-based model conversion for integrating external metadata persisted in an XML-based format into MOIN. Given an external XML format, for example, an XSD schema, a Model Import component creates MOIN models based on the conceptual metamodel implied by the XSD.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method executable by a processor of converting first metadata related to a first model to second metadata related to a second model, comprising the steps of:

providing a declarative mapping between a first metamodel and a second metamodel, wherein said first metamodel relates to said first model and said second metamodel relates to said second model;

providing a plurality of custom exits, wherein said plurality of custom exits provide programmable mapping rules in addition to said declarative mapping, and wherein said plurality of custom exits map other than a one-to-one mapping of elements between the first metamodel and the second metamodel;

maintaining a translation backlog that contains a first plurality of elements that have already been processed and a second plurality of elements whose processing has been postponed; and applying said declarative mapping and said plurality of custom exits to said first metadata to result in said second metadata, wherein said step of applying said declarative mapping applies said declarative mapping with reference to said translation backlog, and wherein the plurality of custom exits resolve complex semantics between the first metamodel and the second metamodel by traversing up and down an input object tree of the first metamodel while simultaneously constructing an output object tree of the second metamodel.

2. The computer-implemented method of claim 1, wherein said step of applying said declarative mapping comprises:
creating an in-memory representation of an input document; and
recursively traversing said in-memory representation of said input document.

3. The computer-implemented method of claim 1, wherein said declarative mapping comprises a meta object facility (MOF) based mapping model that maps M1 instances of an extensible markup language schema definition (XSD) metamodel to M2 elements of a target metamodel.

4. The computer-implemented method of claim 1, wherein the plurality of custom exits resolve complex semantics between the first metamodel and the second metamodel.

5. The computer-implemented method of claim 1, wherein the plurality of custom exits traverse up and down an input object tree of the first metamodel.

6. The computer-implemented method of claim 1, wherein the plurality of custom exits resolve complex semantics between the first metamodel and the second metamodel by traversing up and down an input object tree of the first metamodel.

7. The computer-implemented method of claim 1, wherein the plurality of custom exits registers a context of a missing element in the second metamodel.

8. The computer-implemented method of claim 1, wherein applying said declarative mapping and said plurality of custom exits includes:
recognizing a missing element in the output object tree;
registering the missing element in the translation backlog;
checking the translation backlog to see if the missing element has been created in the output object tree; and
creating a dependent element of the missing element in the output object tree when the translation backlog indicates that the missing element has been created.

9. The computer-implemented method of claim 1, wherein the second plurality of elements includes an element that was postponed from a prior pass of applying said declarative mapping and said plurality of custom exits.

10. The computer-implemented method of claim 1, wherein the second plurality of elements includes a first element that was postponed from a prior pass of applying said declarative mapping and said plurality of custom exits due to a second element not being present in said output object tree.

11. A computer system including a processor and software for converting first metadata related to a first model to second metadata related to a second model, said software comprising:

a first filesystem software file that stores said first metadata and a first metamodel, wherein said first metamodel relates to said first model;

a second filesystem software file that stores said second metadata and a second metamodel, wherein said second metamodel relates to said second model;

a declarative mapping table software file that provides a declarative mapping between said first metamodel and said second metamodel;

a custom exits software file that stores a plurality of custom exits, wherein said plurality of custom exits provide programmable mapping rules in addition to said declarative mapping, and wherein said plurality of custom exits map other than a one-to-one mapping of elements between the first metamodel and the second metamodel;

a translation backlog software file that contains a first plurality of elements that have already been processed and a second plurality of elements whose processing has been postponed; and a model import software file that applies said declarative mapping and said plurality of custom exits to said first metadata to result in said second metadata, wherein said model import software file applies said declarative mapping with reference to said translation backlog software file, and wherein the plurality of custom exits resolve complex semantics between the first metamodel and the second metamodel by traversing up and down an input object tree of the first metamodel while simultaneously constructing an output object tree of the second metamodel.

12. The computer system of claim 11, further comprising:
a document object model (DOM) software file that accesses said first metadata, wherein said first metadata comprises extensible markup language (XML) elements, and wherein said model import software file applies said declarative mapping to said first metadata having been accessed by said DOM software file.

13. The computer system of claim 11, further comprising:
a post schema validation infoset (PSVI) software file that accesses an extensible markup language (XML) schema application programming interface (API), wherein said XML schema API corresponds to said first metamodel, wherein said declarative mapping table software file references instances of said first metamodel via said PSVI software file.

14. A non-transitory computer-readable medium containing instructions for controlling a computer system to perform a method of converting first metadata related to a first model to second metadata related to a second model, said method comprising the steps of:

providing a declarative mapping between a first metamodel and a second metamodel, wherein said first metamodel relates to said first model and said second metamodel relates to said second model;

providing a plurality of custom exits, wherein said plurality of custom exits provide programmable mapping rules in addition to said declarative mapping, and wherein said plurality of custom exits map other than a one-to-one mapping of elements between the first metamodel and the second metamodel;

maintaining a translation backlog that contains a first plurality of elements that have already been processed and a second plurality of elements whose processing has been postponed; and applying said declarative mapping and said plurality of custom exits to said first metadata to result in said second metadata, wherein said step of applying said declarative mapping applies said declarative mapping with reference to said translation backlog, and wherein the plurality of custom exits resolve complex semantics between the first metamodel and the second metamodel by traversing up and down an input object tree of the first metamodel while simultaneously constructing an output object tree of the second metamodel.

15. The non-transitory computer-readable medium of claim 14, wherein said method further comprises:
generating said declarative mapping based on a source artifact of an extensible markup language schema definition (XSD) schema and a target artifact of a web service description language (WSDL) metamodel.

16. The non-transitory computer-readable medium of claim 14, wherein said method further comprises:
generating said declarative mapping based on a source artifact of a web service description language (WSDL) metamodel and a target artifact of an extensible markup language schema definition (XSD) schema.

17. The non-transitory computer-readable medium of claim 14, wherein said method further comprises:
generating said second metamodel based on said first metamodel.

18. The non-transitory computer-readable medium of claim 14, wherein said method further comprises:
generating said second metamodel that comprises a web service description language (WSDL) metamodel based on said first metamodel that comprises an extensible markup language (XML) schema.

19. The non-transitory computer-readable medium of claim 14, wherein said declarative mapping is generated based on an extensible markup language (XML) element name as an input and a meta object facility (MOF) ModelElement as an output.

20. The non-transitory computer-readable medium of claim 14, wherein said step of applying said declarative mapping comprises:
creating an in-memory representation of an input document; and
recursively traversing said in-memory representation of said input document.

* * * * *